United States Patent
Shiraishi (10) Patent No.: US 10,679,097 B2
(45) Date of Patent: Jun. 9, 2020

(54) IMAGE PROCESSING APPARATUS, X-RAY DIAGNOSTIC APPARATUS, AND IMAGE PROCESSING METHOD

(71) Applicant: Canon Medical Systems Corporation, Otawara-shi (JP)

(72) Inventor: Kunio Shiraishi, Otawara (JP)

(73) Assignee: Canon Medical Systems Corporation, Otawara-shi (JP)

( * ) Notice: Subject to any disclaimer, the term of this patent is extended or adjusted under 35 U.S.C. 154(b) by 52 days.

(21) Appl. No.: 15/869,918

(22) Filed: Jan. 12, 2018

(65) Prior Publication Data

US 2018/0211132 A1 Jul. 26, 2018

(30) Foreign Application Priority Data

Jan. 20, 2017 (JP) .................................. 2017-008818

(51) Int. Cl.
*G06K 9/00* (2006.01)
*G06K 9/62* (2006.01)
(Continued)

(52) U.S. Cl.
CPC ............. *G06K 9/6215* (2013.01); *G06K 9/40* (2013.01); *G06K 9/6202* (2013.01); *G06T 5/002* (2013.01);
(Continued)

(58) Field of Classification Search
CPC . G06T 5/002; G06T 5/20; G06T 2207/20012; G06T 2207/20021;
(Continued)

(56) References Cited

U.S. PATENT DOCUMENTS 7,492,947 B2    2/2009  Nanbu
7,656,442 B2 *  2/2010  Tsuruoka ............... H04N 5/367
                                                          348/222.1
(Continued)

FOREIGN PATENT DOCUMENTS

JP         4170767       10/2008
JP       2012-523790     10/2012
(Continued)

OTHER PUBLICATIONS

Masayuki Nishiki et al. "Method for reducing noise in X-ray images by averaging pixels based on the normalized difference with the relevant pixel," Japanese Society of Radiological Technology and Japan Society of Medical Physics, DOI 10.1007/s12194-008-0028-z,2008, pp. 8.

*Primary Examiner* — Li Liu
(74) *Attorney, Agent, or Firm* — Oblon, McClelland, Maier & Neustadt, L.L.P.

(57) ABSTRACT

An image processing apparatus according to an embodiment comprises processing circuitry configured to determine whether each pixel included in a radiation image is equivalent to point-like noise, calculate a degree of similarity between a first pixel and a second pixel that are included in the radiation image, conduct weighted averaging on the first pixel and the second pixel in accordance with the degree of similarity calculated, thereby performing a filtering process on the radiation image, and compare, if it is determined that the first pixel is equivalent to the point-like noise, first neighboring pixels located around the first pixel with second neighboring pixels located around the second pixel without using a comparison result between the first pixel and the second pixel, thereby calculating the degree of similarity.

16 Claims, 4 Drawing Sheets

(51) Int. Cl.
  *G06T 5/00* (2006.01)
  *G06T 7/00* (2017.01)
  *G06K 9/40* (2006.01)

(52) U.S. Cl.
  CPC ........ *G06T 7/0014* (2013.01); *G06K 2209/05* (2013.01); *G06T 2207/10116* (2013.01); *G06T 2207/30168* (2013.01)

(58) Field of Classification Search
  CPC . G06T 2207/10081; G06T 2207/10116; A61B 6/5258; G06K 9/6215
  See application file for complete search history.

(56) References Cited

U.S. PATENT DOCUMENTS

| | | | |
|---|---|---|---|
| 8,818,126 B2* | 8/2014 | Shin | G06T 5/002 382/232 |
| 9,105,082 B2* | 8/2015 | Kim | G06T 5/002 |
| 9,679,363 B1* | 6/2017 | Li | G06T 5/002 |
| 9,819,879 B2* | 11/2017 | Kim | G06T 5/20 |
| 2010/0013963 A1 | 1/2010 | Jannard et al. | |
| 2010/0265367 A1 | 10/2010 | Jannard et al. | |
| 2013/0113951 A1 | 5/2013 | Jannard et al. | |
| 2014/0003735 A1* | 1/2014 | Artyomov | G06T 5/002 382/275 |
| 2014/0056536 A1 | 2/2014 | Zamyatin et al. | |
| 2015/0003730 A1 | 1/2015 | Jannard et al. | |
| 2015/0093041 A1* | 4/2015 | Kang | G06T 5/002 382/275 |
| 2015/0269711 A1* | 9/2015 | Ohishi | G06T 5/002 382/132 |
| 2015/0348233 A1 | 12/2015 | Jannard et al. | |
| 2017/0053385 A1 | 2/2017 | Jannard et al. | |
| 2017/0270643 A1* | 9/2017 | Baek | G06T 5/002 |
| 2018/0204356 A1* | 7/2018 | Xia | G06T 11/005 |

FOREIGN PATENT DOCUMENTS

| | | |
|---|---|---|
| JP | 2012-256175 | 12/2012 |
| JP | 2014-45488 | 3/2014 |

* cited by examiner

IMAGE PROCESSING APPARATUS, X-RAY DIAGNOSTIC APPARATUS, AND IMAGE PROCESSING METHOD

CROSS-REFERENCE TO RELATED APPLICATIONS

This application is based upon and claims the benefit of priority from Japanese Patent Application No. 2017-8818, filed on Jan. 20, 2017; the entire contents of which are incorporated herein by reference.

FIELD

Embodiments described herein relate generally to an image processing apparatus, an X-ray diagnostic apparatus, and an image processing method.

BACKGROUND

X-ray diagnostic apparatuses detect X-rays transmitted through a subject by using an X-ray detector to acquire X-ray images. Although dominant X-ray detectors are planar detectors that use the thin film transistor (TFT) technology of liquid crystal displays, there are also X-ray detectors that use couple charged device (CCD) image sensors, complementary metal oxide semiconductor (CMOS) image sensors, or the like. Here, in X-ray images acquired by using an X-ray detector of the CCD or CMOS, point-like noise (white noise) with a large pixel value sometimes occur in an unexpected manner on a pixel to pixel basis. Specifically, if a CCD or CMOS is used for an X-ray detector, an atom transitions in the CCD or CMOS due to incident X-ray, and the energy emitted from the transitioned atom is detected, which results in noise.

Furthermore, X-ray diagnostic apparatuses perform image processing on acquired X-ray images to reduce noise. For example, the X-ray diagnostic apparatus reduces noise due to a filtering process, during which the degree of similarity between pixels included in an X-ray image is calculated and weighted averaging is conducted on pixels by using the calculated degree of similarity. Such a filtering process includes, for example, a noise reduction process using a filter (hereafter, referred to as a coherent filter) disclosed in Japanese Patent No. 4170767, a non-local means (NLM) filter, or the like. The noise reduction process using the above filters makes it possible to improve the image quality of X-ray images by decreasing noise while the occurrence of blurring is reduced.

However, if an X-ray image includes white noise, the white noise sometimes remains even after a filtering process. Specifically, the calculated degree of similarity between the pixel, which is white noise, and a different pixel is low, and a weight used for weighted averaging is small; as a result, even if weighted averaging is conducted, the pixel value is not so changed, and white noise still remains. Furthermore, in X-ray images after a noise reduction process, noise other than white noise is reduced and, as a result, white noise becomes more noticeable in some cases.

DETAILED DESCRIPTION

An image processing apparatus according to an embodiment comprises processing circuitry. The processing circuitry is configured to determine whether each pixel included in a radiation image is equivalent to point-like noise. The processing circuitry is configured to calculate a degree of similarity between a first pixel and a second pixel that are included in the radiation image. The processing circuitry is configured to conduct weighted averaging on the first pixel and the second pixel in accordance with the degree of similarity calculated, thereby performing a filtering process on the radiation image. And the processing circuitry is configured to compare, if it is determined that the first pixel is equivalent to the point-like noise, first neighboring pixels located around the first pixel with second neighboring pixels located around the second pixel without using a comparison result between the first pixel and the second pixel, thereby calculating the degree of similarity.

With reference to the drawings, an explanation is given below of an image processing apparatus, an X-ray diagnostic apparatus, and an image processing method according to an embodiment. Furthermore, an X-ray diagnostic apparatus that includes the image processing apparatus according to the embodiment is explained below. Moreover, an explanation is given below of a case where the target images for image processing are X-ray images acquired by the X-ray diagnostic apparatus.

First Embodiment

Figure 1:
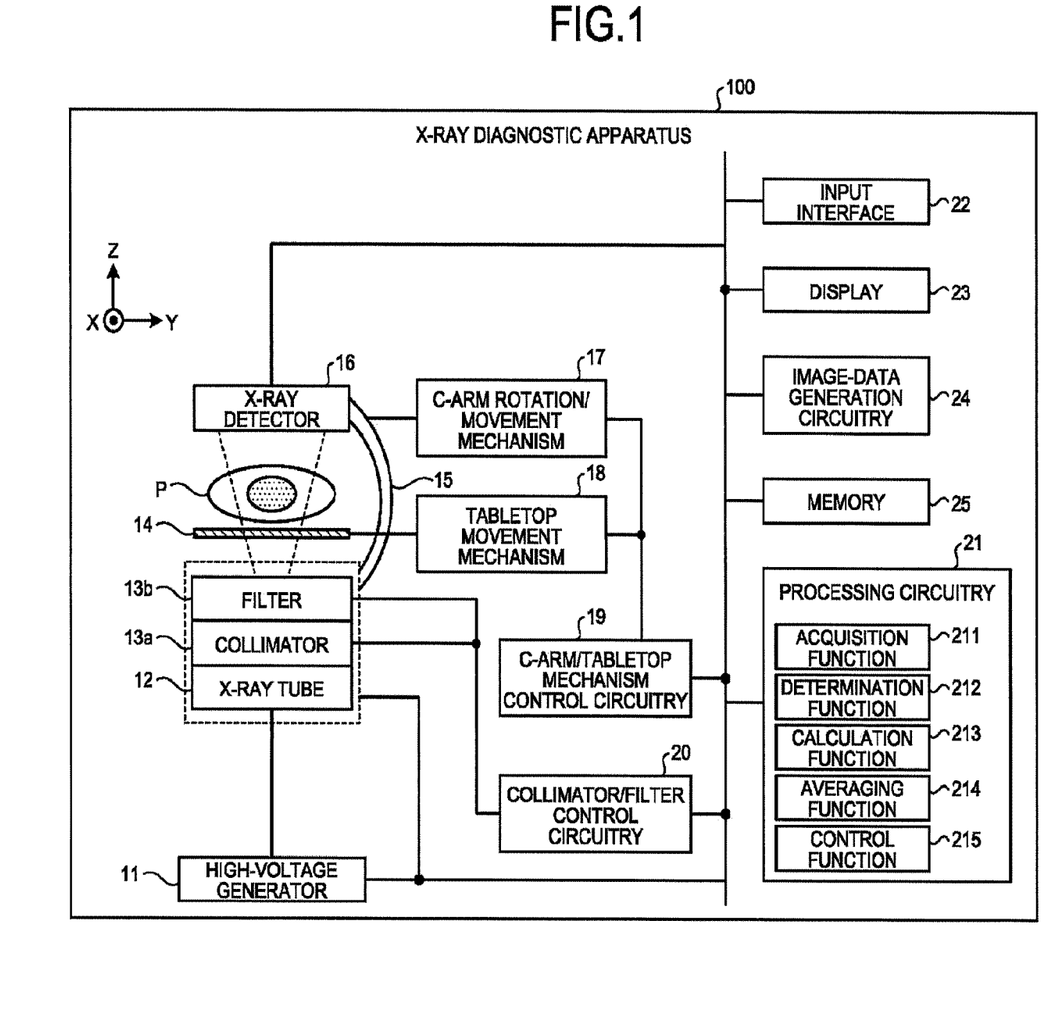
FIG. 1 is a block diagram that illustrates an example of the configuration of an X-ray diagnostic apparatus according to a first embodiment.

First, by using FIG. 1, an example of the configuration of an X-ray diagnostic apparatus 100 according to a first embodiment is explained. FIG. 1 is a block diagram that illustrates an example of the configuration of the X-ray diagnostic apparatus 100 according to the first embodiment. As illustrated in FIG. 1, the X-ray diagnostic apparatus 100 according to the first embodiment includes a high-voltage generator 11, an X-ray tube 12, a collimator 13a, a filter 13b, a tabletop 14, a C arm 15, and an X-ray detector 16. Furthermore, the X-ray diagnostic apparatus 100 according to the first embodiment includes a C-arm rotation/movement mechanism 17, a tabletop movement mechanism 18, C-arm/ tabletop mechanism control circuitry 19, a collimator/filter control circuitry 20, processing circuitry 21, an input interface 22, a display 23, image-data generation circuitry 24, and a memory 25.

In the X-ray diagnostic apparatus 100 illustrated in FIG. 1, each processing function is stored in the memory 25 in the form of program executable by a computer. The C-arm/ tabletop mechanism control circuitry 19, the collimator/filter control circuitry 20, the processing circuitry 21, and the image-data generation circuitry 24 are processors that implement the functions that correspond to the respective programs by reading the programs from the memory 25 and executing them. In other words, each circuitry in a state where each program has been read has the function that corresponds to the read program.

The term "processor" used in the above explanation is, for example, a central processing unit (CPU), a graphics processing unit (GPU), or a circuit, such as an Application Specific Integrated Circuit (ASIC), a programmable logic medical device (e.g., a simple programmable logic medical device (simple programmable logic device: SPLD), a complex programmable logic medical device (complex programmable logic device: CPLD), or a field programmable gate array (FPGA)). The processor reads the program stored in the memory 25 and executes it, thereby implementing the function. Furthermore, instead of storing programs in the memory 25, a configuration may be such that programs are directly installed in circuitry of a processor. In this case, the processor reads the program installed in the circuitry and executes it, thereby implementing the function. Moreover, with regard to each processor according to the present embodiment, as well as the case where each processor is configured as a single circuit, multiple independent circuits may be combined to be configured as a single processor to implement the function.

An acquisition function 211 according to the first embodiment is an example of the acquisition process by processing circuitry in claims. Furthermore, a determination function 212 according to the first embodiment is an example of the determination process by the processing circuitry in claims. Furthermore, a calculation function 213 according to the first embodiment is an example of the calculation process by the processing circuitry in claims. Furthermore, an averaging function 214 according to the first embodiment is an example of the averaging process by the processing circuitry in claims.

The high-voltage generator 11 generates a high voltage under the control of the processing circuitry 21 and feeds the generated high voltage to the X-ray tube 12. The X-ray tube 12 uses the high voltage supplied from the high-voltage generator 11 to generate X-rays. Under the control of the collimator/filter control circuitry 20, the collimator 13a narrows down the X-rays, generated by the X-ray tube 12, such that they are selectively emitted to the capturing target area of a subject P. For example, the collimator 13a includes four slidable aperture blades. The collimator 13a slides the aperture blades under the control of the collimator/filter control circuitry 20 so as to narrow down the X-rays, generated by the X-ray tube 12, and emit them to the subject P. Furthermore, the aperture blades are plate-like members that are made of lead, or the like, and they are provided near the X-ray irradiation port of the X-ray tube 12 to adjust the irradiation range of X-rays.

The filter 13b is an X-ray filter for adjusting X-rays emitted by the X-ray tube 12. For example, for the purpose of a reduction in the radiation dose to the subject P and an improvement in the image quality of image data, the filter 13b changes the radiation quality of transmitted X-rays depending on its material or thickness to reduce soft X-ray components that are easily absorbed into the subject P or reduce high energy components that cause a decrease in the contrast of X-ray images. Furthermore, the filter 13b changes the radiation amount of X-rays and the irradiation range depending on its material, thickness, position, or the like, to attenuate X-rays such that the X-ray, emitted from the X-ray tube 12 to the subject P, has a predetermined distribution.

The tabletop 14 is a bed on which the subject P is placed, and it is provided n an undepicted bed. Furthermore, the subject P is not included in the X-ray diagnostic apparatus 100. The X-ray detector 16 includes detecting elements that are arranged in a matrix, and it detects X-rays that are transmitted through the subject P. For example, the X-ray detector 16 includes CMOS or CCD as detecting elements. Each of the detecting elements converts X-rays, transmitted through the subject P, into electric signals, stores them, and transmits the stored electric signals to the image-data generation circuitry 24.

The C arm 15 holds the X-ray tube 12, the collimator 13a, the filter 13b, and the X-ray detector 16. The X-ray tube 12, the collimator 13a, and the filter 13b are opposed to the X-ray detector 16 with the subject P interposed therebetween as being positioned by the C arm 15. Furthermore, in FIG. 1, an explanation is given of, for example, a case where the X-ray diagnostic apparatus 100 is a single plane; however, this is not a limitation on the embodiment, and there may be a case where it is a bi-plane.

The C-arm rotation/movement mechanism 17 is a mechanism that rotates and moves the C arm 15, and the tabletop movement mechanism 18 is a mechanism that moves the tabletop 14. For example, by using the power that is generated by an undepicted actuator (motor, or the like), the C-arm rotation/movement mechanism 17 and the tabletop movement mechanism 18 rotate and move the C arm 15, thereby moving the tabletop 14. Under the control of the processing circuitry 21, the C-arm/tabletop mechanism control circuitry 19 controls the C-arm rotation/movement mechanism 17 and the tabletop movement mechanism 18 so as to adjust rotation or movement of the C arm 15 or movement of the tabletop 14.

Under the control of the processing circuitry 21, the collimator/filter control circuitry 20 adjusts the aperture of the aperture blade included in the collimator 13a, thereby controlling the irradiation range of X-rays that are emitted to the subject P. Furthermore, under the control of the processing circuitry 21, the collimator/filter control circuitry 20 adjusts the position of the filter 13b, thereby controlling the distribution of the radiation dose of X-rays that are emitted to the subject P.

The image-data generation circuitry 24 generates image data by using electric signals converted from X-rays by the X-ray detector 16 and stores the generated image data in the memory 25. For example, the image-data generation circuitry 24 conducts current/voltage conversion, analog (A)/digital (D) conversion, or parallel/serial conversion on electric signals that are received from the X-ray detector 16 to generate image data. Then, the image-data generation circuitry 24 stores the generated image data in the memory 25.

The memory 25 receives the image data, generated by the image-data generation circuitry 24, and stores it. Furthermore, the memory 25 stores image data that has undergone a filtering process by the processing circuitry 21 that is described later. Furthermore, the memory 25 stores programs that correspond to various functions that are read and performed by the respective circuitry illustrated in FIG. 1. For example, the memory 25 stores the program that corresponds to the acquisition function 211 that is read and executed by the processing circuitry 21, the program that corresponds to the determination function 212, the program that corresponds to the calculation function 213, the program that corresponds to the averaging function 214, and the program that corresponds to a control function 215. The memory 25, illustrated in FIG. 1, may be separated or combined as appropriate.

The input interface 22 is implemented by a trackball, switch button, mouse, keyboard, or the like, to make various commands, various settings, or the like. The input interface 22 is connected to the processing circuitry 21 so that it converts input operations, received from an operator, into electric signals and outputs them to the processing circuitry 21. The display 23 presents a graphical user interface (GUI) for receiving operator's commands or X-ray images. For example, the display 23 presents X-ray images that have undergone a filtering process by the processing circuitry 21.

The processing circuitry 21 performs the acquisition function 211, the determination function 212, the calculation function 213, the averaging function 214, and the control function 215, thereby controlling the overall operation of the X-ray diagnostic apparatus 100. For example, the processing circuitry 21 reads the program that corresponds to the acquisition function 211 from the memory 25 and executes it to control X-ray irradiation to the subject P and detection of X-rays that are transmitted through the subject P and acquire image data.

For example, the processing circuitry 21 controls the high-voltage generator 11 in accordance with an operator's command, which is transferred from the input interface 22, to adjust the voltage supplied to the X-ray tube 12, thereby controlling ON/OFF of radiation dose of X-rays that are emitted to the subject P. Furthermore, for example, the processing circuitry 21 controls the C-arm/tabletop mechanism control circuitry 19 in accordance with an operator's command, thereby adjusting rotation or movement of the C arm 15 and movement of the tabletop 14. Furthermore, for example, the processing circuitry 21 controls the collimator/filter control circuitry 20 in accordance with an operator's command to adjust the aperture of the aperture blades included in the collimator 13a, thereby controlling the irradiation range of X-rays that are emitted to the subject P. Furthermore, for example, the processing circuitry 21 controls the collimator/filter control circuitry 20 in accordance with an operator's command to adjust the position of the filter 13b, thereby controlling the radiation dose of X-rays that are emitted to the subject P and controlling the irradiation range of X-rays for each dose of radiation. That is, the processing circuitry 21 controls the distribution of the radiation dose of X-rays through the control of the collimator/filter control circuitry 20. Furthermore, the processing circuitry 21 controls the image-data generation circuitry 24 so as to control an image-data generation process based on electric signals converted from X-rays by the X-ray detector 16, thereby acquiring image data.

Furthermore, the processing circuitry 21 reads the programs that correspond to the determination function 212, the calculation function 213, and the averaging function 214 from the memory 25 and executes them, thereby performing a filtering process on image data. The filtering process by the processing circuitry 21 is described later. Furthermore, the processing circuitry 21 reads the program that corresponds to the control function 15 from the memory 25 and executes it, thereby presenting X-ray images after the filtering process on the display 23 or presenting the GUI for receiving operator's commands on the display 23.

Heretofore, an example of the configuration of the X-ray diagnostic apparatus 100 is explained. With this configuration, the X-ray diagnostic apparatus 100 according to the present embodiment prevents a decrease in the resolution of image data and also removes point-like noise during the process of the processing circuitry 21, described below in detail. Specifically, the X-ray diagnostic apparatus 100 determines whether each pixel included in image data is equivalent to point-like noise and calculates the degree of similarity between pixels without using the pixel value of the pixel that is equivalent to point-like noise. Then, the X-ray diagnostic apparatus 100 uses the calculated degree of similarity to conduct weighted averaging, thereby removing point-like noise. A detailed explanation is given below of the process performed by the X-ray diagnostic apparatus 100 according to the first embodiment.

First, the acquisition function 211 controls the high-voltage generator 11, the C-arm/tabletop mechanism control circuitry 19, the collimator/filter control circuitry 20, and the image-data generation circuitry 24 so as to acquire the image data based on the X-rays transmitted through the subject P and stores the acquired image data in the memory 25.

Next, the determination function 212 reads the image data stored in the memory 25 and determines whether each pixel included in the read image data is equivalent to point-like noise. Furthermore, spike noise is explained below as an example of the point-like noise. The spike noise is speckle noise (white noise) that occurs when X-rays are emitted to the X-ray detector 16 that uses CMOS or CCD. For example, even if spike noise is not included in a certain frame of the moving image, it occurs in any pixel of the next frame or it disappears in the subsequent frame. That is, spike noise occurs in an unexpected manner on a pixel to pixel basis.

For example, the determination function 212 determines that, among the pixels that constitute image data, the pixel whose pixel value is largely different from those of the neighboring pixels is spike noise. That is, the spike noise is speckle noise, and the pixel value of the pixel, in which spike noise occurs, is significantly large as compared to the pixel value of the pixel, in which spike noise does not occur; therefore, the determination function 212 determines that, among the pixels that constitute image data, the pixel whose pixel value is obviously larger than those of the neighboring pixels is spike noise.

For example, the determination function 212 first selects any of the pixels included in image data as the target pixel (determination target pixel) for which it is determined whether it is equivalent to spike noise. Next, for the determination target pixel, the determination function 212 sets the range (determination range) for determining whether the determination target pixel is equivalent to spike noise. For example, for the determination target pixel, the determination function 212 sets a square area of "3 pixels×3 pixels" with the determination target pixel at a center as the determination range.

Here, the determination range set by the determination function 212 may have any size or shape as long as it is an area that covers multiple pixels including the determination target pixel. For example, the determination range is not limited to a square area of "3 pixels×3 pixels", but it may be an area with a different size, such as a square area of "5 pixels×5 pixels" or it may be an area that is shaped by removing pixels at corners from a square, an area that is shaped like a circle, or the like.

That is, if the determination range includes only the determination target pixel, it is difficult to determine whether the determination target pixel is equivalent to spike noise as there are no pixels whose levels of the pixel values are compared with that of the determination target pixel. Conversely, if the determination range is a range that covers multiple pixels that includes the determination target pixel, it is possible to determine whether the determination target pixel is equivalent to spike noise by comparing it with the level of the pixel value of the neighboring pixel. Furthermore, an explanation is given below of a case where the determination range is a square area of "3 pixels×3 pixels" with the determination target pixel at a center.

Next, the determination function 212 calculates toe information that serves as a comparative criterion for determining whether the determination target pixel is equivalent to spike noise. For example, the determination function 212 calculates the index indicating statistical dispersion with regard to the pixel value of each pixel included in the determination range, which is set for the determination target pixel. Here, as the index indicating statistical dispersion, the determination function 212 may calculate standard deviation, average difference, average absolute deviation, inter-quartile range, or the like. An explanation is given below of, for example, a case where the determination function 212 calculates standard deviation. For example, the determination function 212 calculates the average value with regard to the pixel values of 9 pixels included in the square area of "3 pixels×3 pixels" with the determination target pixel at a center, sums the squares of differences from the average value with regard to the respective pixels, and calculates, as a standard deviation, the square root of the value that is obtained by dividing the summed value by the pieces (9) of data.

Next, the determination function 212 determines whether the determination target pixel is equivalent to spike noise on the basis of the standard deviation that is calculated from the pixel values of the respective pixels included in the determination range. For example, the determination function 212 first acquires the previous data that indicates what percentage of spike noise occurs in each pixel on the basis of the image data previously acquired by using the same X-ray detector 16. Here, the percentage of occurrence of spike noise is changed for each image level (the average value of pixel values, or the like), and therefore the determination function 212 acquires the previous data that indicates the percentage of occurrence of spike noise for each image level.

For example, with regard to the previously acquired image data, the determination function 212 calculates the ratio between the number of pixels in the entire image data and the number of pixels in which spike noise occurs as the percentage of occurrence of spike noise and relates the calculated percentage and the image level of the image data to acquire the previous data. Alternatively, the memory 25 previously stores the previous data that is calculated on the basis of the previously acquired image data, and the determination function 212 reads the previous data from the memory 25, thereby acquiring the previous data.

Next, the determination function 212 sets the threshold for determining whether it is spike noise or not on the basis of the acquired previous data. For example, the determination function 212 acquires the percentage of occurrence of spike noise from the previous data that indicates the percentage of occurrence of spike noise for each image level in accordance with the image level (the average value of the pixel values of the respective pixels included in the determination range, or the like) in the determination range and sets the threshold based on the acquired percentage. For example, the determination function 212 sets the threshold such that it is determined that the pixel with the pixel value of "equal to or more than $3\sigma$" is spike noise.

Then, the determination function 212 determines whether the determination target pixel is equivalent to spike noise on the basis of the set threshold, the standard deviation calculated from the pixel values of the respective pixels included in the determination range, and the pixel value of the determination target pixel. For example, the determination function 212 determines that the determination target pixel is equivalent to spike noise if the pixel value of the determination target pixel is "equal to or more than $3\sigma$" with respect to the average value of the pixel values of the respective pixels included in the determination range. Conversely, the determination function 212 determines that the determination target pixel is not equivalent to spike noise if the pixel value of the determination target pixel is "less than $3\sigma$" with respect to the average value.

As described above, by using the previous data or the standard deviation, the determination function 212 determines whether the determination target pixel is equivalent to spike noise while it gives consideration to changes in the percentage of occurrence of spike noise for each image level, the level of the pixel value that is assumed if the determination target pixel is spike noise, or the like. Furthermore, the image level related to the previous data may be the average value of pixel values, the median value of pixel values, or other representative values.

Furthermore, various modifications may be made to the standard deviation calculated by the determination function 212. For example, the determination function 212 calculates the median value of the pixel values of the 9 pixels included in the square area of "3 pixels×3 pixels" with a pixel a1 at a center, sums the squares of differences from the median value with regard to the respective pixels, and calculates, as standard deviation, the square root of the value that is obtained by dividing the summed value by the pieces (9) of data. That is, the determination function 212 may set the average value of the pixel values of the respective pixels included in the determination range, the median value of the pixel values of the respective pixels included in the determination range, or other representative values as the image level in the determination range.

Furthermore, there may be a case where the determination function 212 calculates a standard deviation with regard to the pixel values of pixels among the pixels included in the determination range except for the determination target pixel. Specifically, if the determination target pixel is spike noise, the standard deviation is calculated by using the group of pixels including the spike noise, which causes a decrease in reliability of determination based on the standard deviation; therefore, the determination function 212 may not use the determination target pixel for calculation of standard deviation.

Furthermore, the determination function 212 sequentially changes the pixel that is the determination target pixel among the pixels included in image data so as to determine whether each pixel included in the image data is equivalent to spike noise. Specifically, the determination function 212 calculates a standard deviation for the pixel value of each pixel included in the determination range, which is set for each pixel, and determines whether each pixel included in the image data is equivalent to spike noise on the basis of the calculated standard deviation.

Here, the percentage of occurrence of spike noise (the expected value of noise) is different for each image level, and therefore if the determination range is large, errors sometimes occur during noise determination. For example, if the set determination range covers multiple sites (organs, bones, or the like) of the subject P, the reliability in noise determination changes for each site of the subject P. Specifically, as compared to noise determination on the site that has brightness closer to the average in the determination range, noise determination on the site that has brightness largely different from the average is inaccurate. Therefore, the determination function 212 sets a determination range that is smaller than each site of the subject P so that a picture in the determination range becomes constant or the pixel value of each pixel in the determination range becomes nearly equal; thus, more accurate noise determination is possible.

Next, an explanation is given of another example of determination by the determination function 212. First, the determination function 212 calculates the index indicating the statistical dispersion with regard to the square root of the pixel value of each pixel included in the image data. Specifically, instead of calculating the index indicating the statistical dispersion with regard to the pixel value in the determination range, which is set for each pixel, the determination function 212 calculates the index indicating the statistical dispersion with regard to the square root of the pixel value of each pixel in the entire image. Furthermore, an explanation is given below of, for example, a case where the determination function 212 calculates standard deviation.

Here, although the expected value of noise is different depending on an image level, the expected value of noise can be uniform if the square root is calculated by applying square-root transformation. Specifically, as the noise occurring in the image data is proportional to the value of the square root of the image level, the determination function 212 may use the standard deviation calculated with regard to the square root of the pixel value to collectively determine whether each pixel of the entire image is spike noise. Furthermore, as it is considered that the noise occurring in the image data is proportional to the value of the square root of the image level if circuit noise is ignored, the determination function 212 may calculate a standard deviation by adding an offset value, which corresponds to an effect of the circuit noise, to the square root of the pixel value.

Then, the determination function 212 determines whether the determination target pixel is equivalent to spike noise on the basis of the standard deviation calculated with regard to the square root of the pixel value of a pixel in the entire image data. Furthermore, the determination function 212 sequentially changes the pixel that is the determination target pixel among the pixels included in the image data to determine whether each pixel included in the image data is equivalent to spike noise. That is, the determination function 212 calculates a standard deviation with regard to the square root of the pixel value of each pixel included in the image data and determines whether each pixel is equivalent to spike noise on the basis of the calculated standard deviation.

Furthermore, there may be a case where, in addition to the above-described standard deviation, the determination function 212 determines whether each pixel equivalent to spike noise on the basis of the modulation transfer function (MTF) of the image data. For example, the determination function 212 first conducts Fourier transform where the pixel value of each pixel in the image data is a function of the position. Here, spike noise is point-like noise; therefore, if spike noise is included in the image data, the MTF with many signals at a high-frequency area is obtained. Meanwhile, if no spike noise is included in the image data, signals at a high-frequency area are decreased.

Therefore, the determination function 212 may determine the presence or absence of spike noise by considering the MTF. Furthermore, the determination function 212 may calculate the MTF for multiple areas, which are set in the image data, to determine the presence or absence of spike noise for the areas and estimate the number of spike noises included in the entire image data. Hence, the determination function 212 determines whether each pixel is equivalent to noise on the basis of the standard deviation and the MTF; thus, determination as to whether it is spike noise or not may be more accurate as compared to a case where it is determined whether it is equivalent to noise on the basis of only the standard deviation.

Furthermore, there may be a case where the determination function 212 determines whether the determination target pixel is equivalent to spike noise in accordance with the level of the pixel value of the determination target pixel with respect to the image level. For example, in image data, the signal that indicates a site of the subject P, a device, or the like, causes a small pixel value with respect to the image level of the entire image data, and it is represented in dark. Meanwhile, spike noise causes a large pixel value with respect to the image level, and it is represented brightly. Therefore, it is possible that the determination function 212 does not determine that the pixel with a pixel value smaller than those of the neighboring ones is spike noise when it is determined whether it is spike noise or not by evaluating a deviation from the image level based on the standard deviation.

Figure 2:
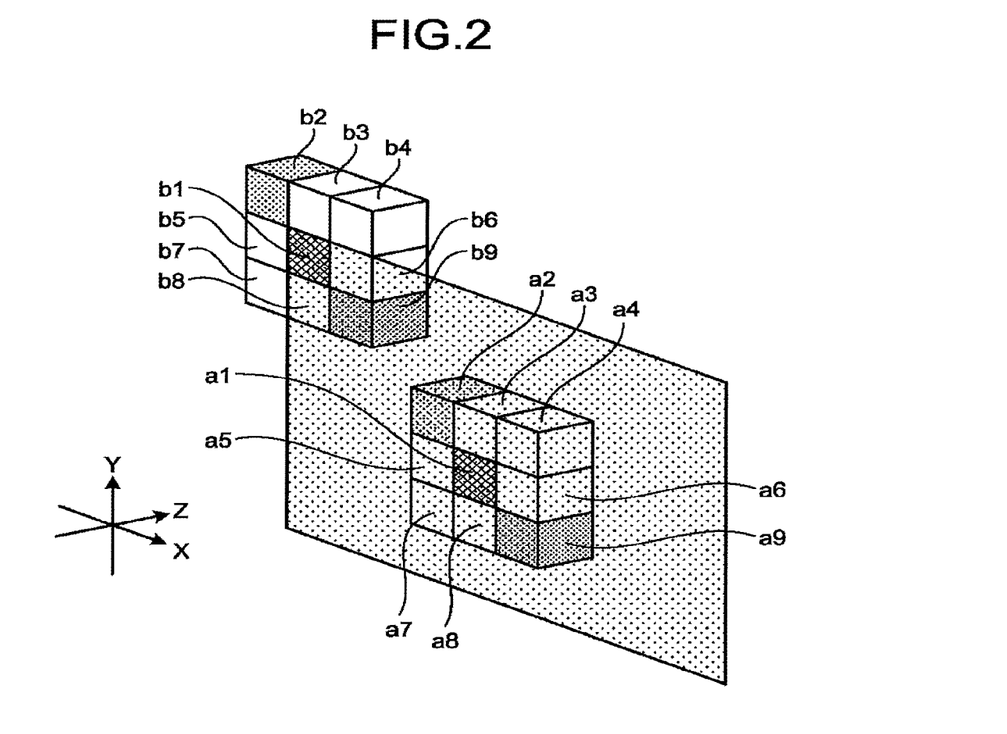
FIG. 2 is a diagram that illustrates calculation of the degree of similarity according to the first embodiment.

After the determination function 212 determines whether each pixel of the image data is equivalent to spike noise, the calculation function 213 calculates the degree of similarity between the pixels included in the image data. With reference to FIG. 2, an explanation is given below of a case where the degree of similarity is calculated for a first pixel and a second pixel among the pixels included in the image data. FIG. 2 is a diagram that illustrates calculation of the degree of similarity according to the first embodiment.

FIG. 2 illustrates the pixel a1 as the first pixel and illustrates a pixel b1 as the second pixel. Furthermore, FIG. 2 illustrates pixels a2 to a9 as the first neighboring pixels that are located around the first pixel and illustrates pixels b2 to b9 as the second neighboring pixels that are located around the second pixel. Moreover, the pixels a1 to a9 and the pixels b1 to b9, illustrated in FIG. 2, are located on the same plane (XY plane).

In FIG. 2, if it is determined that the first pixel (the pixel a1) is not spike noise, the calculation function 213 calculates the degree of similarity between the first pixel (the pixel a1) and the second pixel (the pixel b1) by including the neighboring pixels of the first pixel (the pixel a1) and the second pixel (the pixel b1). For example, the calculation function 213 calculates the degree of similarity between the first pixel (the pixel a1) and the second pixel (the pixel b1) by comparing the first pixel (the pixel a1) and the first neighboring pixels (the pixels a2 to a9) with the second pixel (the pixel b1) and the second neighboring pixels (the pixels b2 to b9).

Next, the averaging function 214 conducts weighted averaging on the first pixel (the pixel a1) and the second pixel (the pixel b1) in accordance with the degree of similarity calculated by the calculation function 213, thereby performing a filtering process on the image data. Specifically, if the degree of similarity between the first pixel (the pixel a1) and the second pixel (the pixel b1) is high, the averaging function 214 applies a large weight to average the pixel value of the first pixel (the pixel a1) and the pixel value of the second pixel (the pixel b1). Conversely, if the degree of similarity between the first pixel (the pixel a1) and the second pixel (the pixel b1) is low, the averaging function 214 sets a small weight to average the pixel value of the first pixel (the pixel a1) and the pixel value of the second pixel (the pixel b1). In this way, pixels are averaged by using weights on the basis of the degree of similarity; thus, the averaging function 214 may remove spike noise while preventing a decrease in the resolution of X-ray images.

Furthermore, in a case where it is determined that the first pixel (the pixel a1) is spike noise, if the pixels a1 to a9 and the pixels b1 to b9 are compared to calculate the degree of similarity and weighted averaging is conducted on the first pixel (the pixel a1) and the second pixel (the pixel b1), spike noise sometimes remains in the first pixel (the pixel a1).

For example, in a case where the first pixel (the pixel a1) is spike noise and the second pixel (the pixel b1) is not spike noise, if the degree of similarity is calculated by comparing the pixels a1 to a9 with the pixels b1 to b9, a low degree of similarity is calculated as the pixel values of the first pixel (the pixel a1) and the second pixel (the pixel b1) are largely different. If weighted averaging is conducted on the first pixel (the pixel a1) and the second pixel (the pixel b1) with a weight as the low degree of similarity, the pixel value of the first pixel (the pixel a1) slightly changes and spike noise remains.

Furthermore, for example, in a case where both the first pixel (the pixel a1) and the second pixel (the pixel b1) are spike noise, if the degree of similarity is calculated by comparing the pixels a1 to a9 with the pixels b1 to b9, a high degree of similarity is calculated as the first pixel (the pixel a1) and the second pixel (the pixel b1) have a similarity that their pixel values are larger than those of the neighboring pixels. However, even if weighted averaging is conducted together with the second pixel (the pixel b1), which is spike noise, the pixel value of the first pixel (the pixel a1) slightly changes, and spike noise remains.

Therefore, if it is determined that the first pixel (the pixel a1) is spike noise, the calculation function 213 calculates the degree of similarity between the first pixel (the pixel a1) and the second pixel (the pixel b1) without using the pixel value of the first pixel (the pixel a1). For example, the calculation function 213 calculates the degree of similarity between the first pixel (the pixel a1) and the second pixel (the pixel b1) by comparing the first neighboring pixels (the pixels a2 to a9) and the second neighboring pixels (the pixels b2 to b9).

The calculation function 213 calculates the degree of similarity without using the pixel value of the first pixel (the pixel a1), which is spike noise; thus, even though the second pixel (the pixel b1) is not spike noise, a large value is calculated as the degree of similarity if their neighboring pixels are similar. Then, the averaging function 214 conducts weighted averaging on the first pixel (the pixel a1) together with the second pixel (the pixel b1), which is not spike noise, with a weight as a high degree of similarity so that the pixel value of the first pixel (the pixel a1) becomes closer to the pixel value of the second pixel (the pixel b1). That is, the calculation function 213 reduces spike noise in the first pixel (the pixel a1).

In FIG. 2, an explanation is given of a case where calculation of the degree of similarity and weighted averaging are conducted with the pixel a1 as the first pixel and the pixel b1 as the second pixel among the pixels included in the image data. Furthermore, the calculation function 213 and the averaging function 214 perform calculation of the degree of similarity and weighted averaging with regard to each combination of pixels included in image data by sequentially changing the pixel, which is the first pixel, and the pixel, which is the second pixel, among the pixels included in image data.

For example, the calculation function 213 and the averaging function 214 perform calculation of the degree of similarity and weighted averaging, where first the pixel a1 is the first pixel and a pixel except for the pixel a1 among the pixels included in the image data is the second pixel in turn. Then, the calculation function 213 and the averaging function 214 perform calculation of the degree of similarity and weighted averaging, where the first pixel is changed into any pixel among the pixels included in the image data except for the pixel a1 and a pixel except for the pixel a1, which has been already the first pixel, and the first pixel being changed is the second pixel in turn. Furthermore, until all the pixels included in the image data have been the first pixel, the calculation function 213 and the averaging function 214 repeatedly perform the process to conduct calculation of the degree of similarity and weighted averaging, where the first pixel is changed into any pixel among the pixels included in the image data except for the pixels that have been already the first pixel, and a pixel except for the pixels that have been already the first pixel and the first pixel being changed is the second pixel in turn.

Furthermore, in FIG. 2, an explanation is given of a case where the first neighboring pixels are 8 pixels (the pixels a2 to a9) around the first pixel (the pixel a1); however, the range of pixels as the first neighboring pixels is optional. For example, instead of 8, the first neighboring pixels may be 24 pixels except for the first pixel (the pixel a1), included in the square area of "5 pixels×5 pixels" with the first pixel (the pixel a1) at a center. Furthermore, for example, the first neighboring pixels may not be the pixels included in the square area with the first pixel (the pixel a1) at a center, but it may be, for example, the pixels included in an area that is shaped by removing pixels at corners from a square or that is shaped like a circle. Moreover, the range of the second neighboring pixels corresponds to the range of the first neighboring pixels.

Then, the control function 215 stores the image data, which has undergone image processing (filtering process) by the determination function 212, the calculation function 213, and the averaging function 214, in the memory 25. Furthermore, the control function 215 generates a display image from the image data that has undergone the image processing, stored in the memory 25, and presents it on the display 23.

Figure 3:
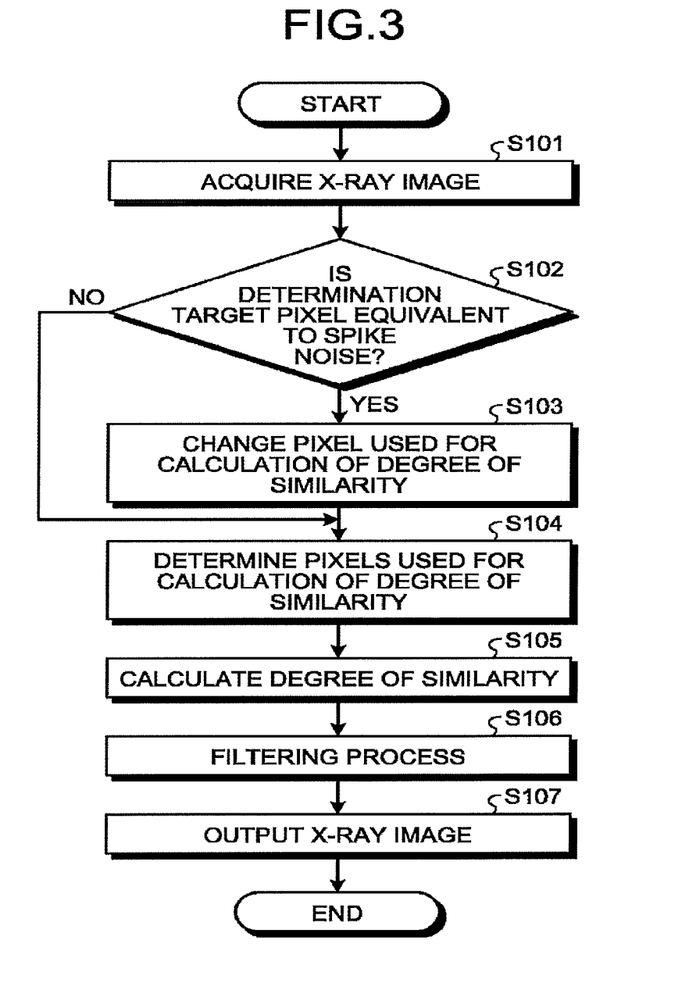
FIG. 3 is a flowchart that illustrates the sequential flow of the process by the X-ray diagnostic apparatus according to the first embodiment.

Next, with reference to FIG. 3, an explanation is given of an example of the steps of the process by the X-ray diagnostic apparatus 100. FIG. 3 is a flowchart that illustrates the sequential flow of the process by the X-ray diagnostic apparatus 100 according to the first embodiment. Step S101 is a step that corresponds to the acquisition function 211. Step S102 is a step that corresponds to the determination function 212. Step S103, Step S104, and Step S105 are steps that correspond to the calculation function 213. Step S106 is a step that corresponds to the averaging function 214. Step S107 is a step that corresponds to the control function 215.

First, the processing circuitry 21 acquires X-ray images on the basis of X-rays that have been transmitted through the subject P (Step S101) and determines whether the determination target pixel in the acquired X-ray image is equivalent to spike noise (Step S102). If the determination target pixel is equivalent to spike noise (Yes at Step S102), the processing circuitry 21 changes the pixel that is used for calculation of the degree of similarity (Step S103). For example, the processing circuitry 21 changes the pixels used for calculation of the degree of similarity from the pixels a1 to a9 and the pixels b1 to b9 into the pixels a2 to a9 and the pixels b2 to b9, illustrated in FIG. 2.

After the pixels used for calculation of the degree of similarity are changed, or if the determination target pixel is not equivalent to spike noise (No at Step S102), the processing circuitry 21 determines the pixels used for calculation of the degree of similarity (Step S104) and calculates the degree of similarity by using the determined pixels (Step S105). Next, the processing circuitry 21 performs a filtering process in accordance with the calculated degree of similarity (Step S106). Specifically, the processing circuitry 21 performs a process to conduct weighted averaging on pixels in accordance with the calculated degree of similarity. Then, the processing circuitry 21 outputs the filtered X-ray image (Step S107) and terminates the process.

As described above, according to the first embodiment, the determination function 212 determines whether each pixel included in an X-ray image is equivalent to spike noise. The calculation function 213 calculates the degree of similarity between the first pixel and the second pixel, included in the X-ray image. The averaging function 214 conducts weighted averaging on the first pixel and the second pixel in accordance with the calculated degree of similarity, thereby performing a filtering process on the X-ray image. If it is determined that the first pixel is equivalent to spike noise, the calculation function 213 compares the first neighboring pixels, which are located around the first pixel, and the second neighboring pixels, which are located around the second pixel, thereby calculating the degree of similarity between the first pixel and the second pixel. Thus, the X-ray diagnostic apparatus 100 according to the first embodiment may remove point-like noise while it prevents a decrease in the resolution of X-ray images.

Second Embodiment

In the above-described first embodiment, an explanation is given of a case where the degree of similarity is calculated by comparing the first neighboring pixels and the second neighboring pixels as an example of the method for calculating the degree of similarity between the first pixel and the second pixel without using the pixel value of the first pixel if it is determined that the first pixel is spike noise. Conversely, in a second embodiment, an explanation is given of variation of the method for calculating the degree of similarity between the first pixel and the second pixel without using the pixel value of the first pixel if it is determined that the first pixel is spike noise.

The X-ray diagnostic apparatus 100 according to the second embodiment has the same configuration as that of the X-ray diagnostic apparatus 100 according to the first embodiment, illustrated in FIG. 1, and has a difference in part of the process by the calculation function 213. Therefore, the part that has the same configuration as that described in the first embodiment is attached with the same reference numeral as that in FIG. 1, and explanations are omitted.

Figure 4:
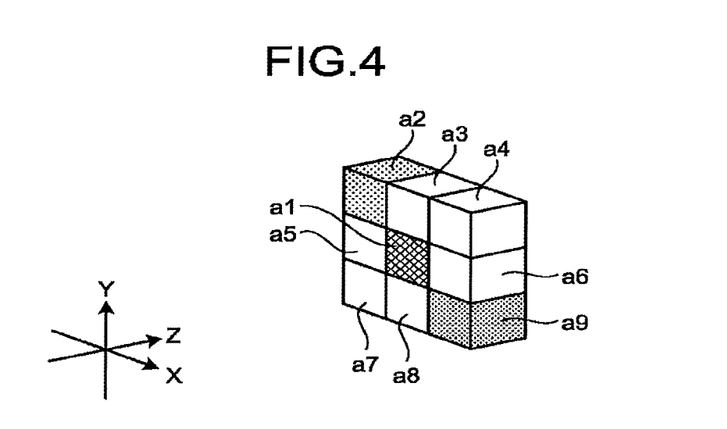
FIG. 4 is a diagram that illustrates calculation of the degree of similarity according to a second embodiment.

With reference to FIG. 4, an explanation is below given of calculation of the degree of similarity according to the second embodiment. FIG. 4 is a diagram that illustrates calculation of the degree of similarity according to the second embodiment. FIG. 4 illustrates the first pixel (the pixel a1) and the first neighboring pixels (the pixels a2 to a9), which are located around the first pixel, among the pixels included in the image data. Furthermore, an explanation is given below of a case where the determination function 212 determines that the first pixel (the pixel a1) is equivalent to spike noise.

First, the calculation function 213 replaces the pixel value of the first pixel with a statistical value based on the pixel values of the first neighboring pixels. For example, the calculation function 213 first replaces the pixel value of the first pixel (the pixel a1) with the average value of the pixel values of the first neighboring pixels (the pixels a2 to a9). Then, the calculation function 213 compares the first pixel (the pixel a1), whose pixel value has been replaced, and the first neighboring pixels (the pixels a2 to a9) with the second pixel and the second neighboring pixels that are not illustrated, thereby calculating the degree of similarity. That is, the calculation function 213 calculates the degree of similarity by comparing 9 pixels. Then, the averaging function 214 conducts weighted averaging on the first pixel and the second pixel in accordance with the calculated degree of similarity.

An explanation is given above of the embodiment where the statistical value based on the pixel values of the first neighboring pixels is the average value of the pixel values of the first neighboring pixels; however, this is not a limitation on the embodiment. For example, there may be a case where the calculation function 213 replaces the pixel value of the first pixel with the average value of the pixel values of the first neighboring pixels, replaces it with the median value of the pixel values of the first neighboring pixels, or replaces it with other representative values based on the pixel values of the first neighboring pixels.

As described above, according to the second embodiment, if it is determined that the first pixel is equivalent to spike noise, the calculation function 213 replaces the pixel value of the first pixel with the average value or the median value of the pixel values of the first neighboring pixels and compares the first pixel, whose pixel value has been replaced, and the first neighboring pixels with the second pixel and the second neighboring pixels, thereby calculating the degree of similarity between the first pixel and the second pixel. Therefore, even though the pixel value of the first pixel is not used, the X-ray diagnostic apparatus 100 according to the second embodiment may remove point-like noise while it keeps the number of pixels used for calculation of the degree of similarity to maintain reliability of the degree of similarity.

Third Embodiment

In the above-described embodiment, an explanation is given of a case where when the degree of similarity between the first pixel and the second pixel is calculated, the first neighboring pixels are compared with the second neighboring pixels or the first pixel and the first neighboring pixels are compared with the second pixel and the second neighboring pixels. That is, in the above-described embodiment, an explanation is given of a case where the pixels used for calculation of the degree of similarity are selected from a single X-ray image. Conversely, according to a third embodiment, an explanation is given of a case where the pixels used for calculation of the degree of similarity are selected from one or more X-ray images.

The X-ray diagnostic apparatus 100 according to the third embodiment has the same configuration as that of the X-ray diagnostic apparatus 100 according to the first embodiment, illustrated in FIG. 1, and has difference in part of the process by the acquisition function 211, the determination function 212, and the calculation function 213. Therefore, the part that has the same configuration as that described in the first embodiment is attached with the same reference numeral as that in FIG. 1, and explanations are omitted.

First, the acquisition function 211 acquires multiple X-ray images over time. For example, the acquisition function 211 continuously acquires X-ray images as two-dimensional images on the XY plane illustrated in FIG. 1 during a certain time interval. Hereinafter, X-ray images acquired over time are described as frames, and each X-ray image is described as a frame.

Figure 5:
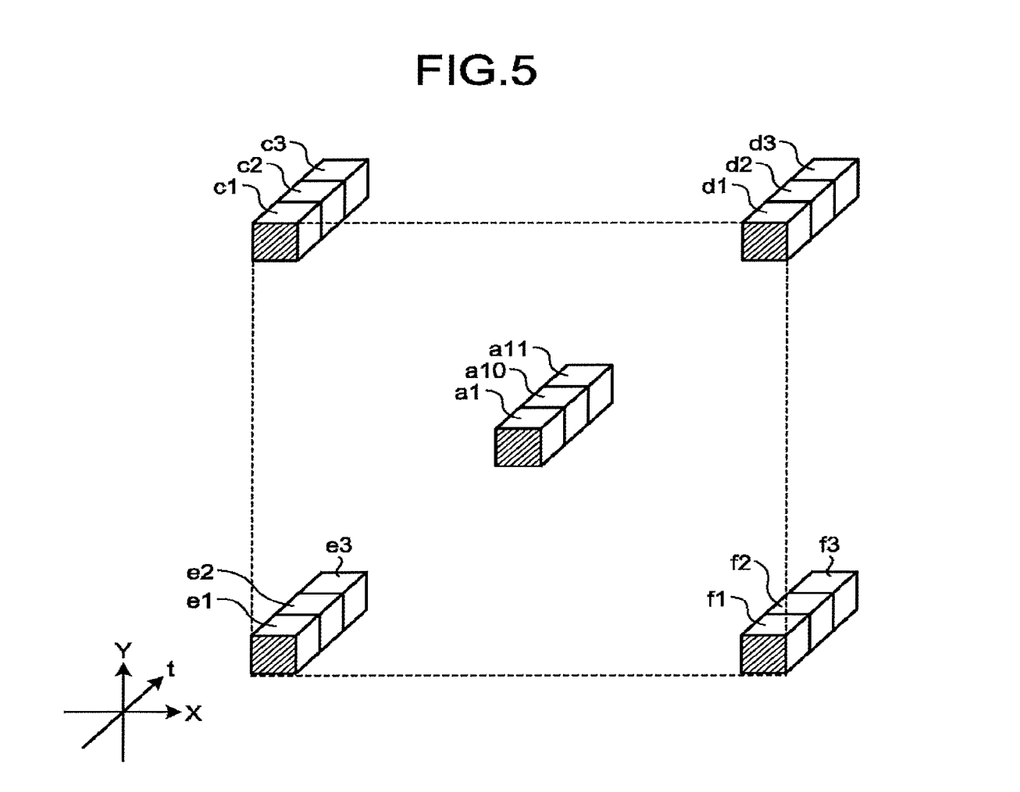
FIG. 5 is a diagram that illustrates determination on spike noise and calculation of the degree of similarity according to a third embodiment.

Then, the determination function 212 determines whether each pixel included in frames is equivalent to spike noise. Here, with reference to FIG. 5, determination on spike noise according to the third embodiment is explained. FIG. 5 is a diagram that illustrates determination on spike noise and calculation of the degree of similarity according to the third embodiment. FIG. 5 illustrates the corresponding pixels at 5 areas in 3 frames out of the frames that are acquired over time.

In FIG. 5, the pixel a1, a pixel c1, a pixel d1, a pixel e1, and a pixel f1 represent pixels on the frame at a time t1. Furthermore, a pixel a10, a pixel c2, a pixel d2, a pixel e2, and a pixel f2 represent pixels on the frame at a time t2. Moreover, a pixel a11, a pixel c3, a pixel d3, a pixel e3, and a pixel f3 represent pixels on the frame at a time t3.

For example, the determination function 212 first determines whether each pixel on the frame at the time t1 is equivalent to spike noise. For example, the determination function 212 sets the determination range for determining whether the pixel a1 is equivalent to spike noise. Here, the determination range is, for example, the square area of 3 pixels in the X direction and 3 pixels in the Y direction with the pixel a1 at a center. Then, the determination function 212 calculates a standard deviation with regard to the pixel value of each pixel included in the determination range and determines whether the pixel a1 is equivalent to spike noise on the basis of the calculated standard deviation. Furthermore, the determination function 212 calculates a standard deviation with regard to the pixel value of each pixel included in the determination range and determines whether each pixel on the frame at the time t1, including the pixel c1, the pixel d1, the pixel e1, and the pixel f1, is equivalent to spike noise. Alternatively, the determination function 212 calculates a standard deviation with regard to the square root of the pixel value of each pixel on the frame at the time t1 and determines whether each pixel on the frame at the time t1 is equivalent to spike noise on the basis of the calculated standard deviation.

Furthermore, with regard to each pixel (the pixel a10, the pixel c2, the pixel d2, the pixel e2, the pixel f2, or the like) on the frame at the time t2, each pixel (the pixel a11, the pixel c3, the pixel d3, the pixel e3, the pixel f3, or the like) on the frame at the time t3, or each pixel on other undepicted frames, the determination function 212 determines whether it is equivalent to spike noise.

Then, the calculation function 213 calculates the degree of similarity between pixels on the frame. For example, the calculation function 213 first calculates the degree of similarity between the first pixel (e.g., the pixel a1) and the second pixel (e.g., the pixel c1) on the frame at the time t1. Here, an explanation is first given of calculation of the degree of similarity with the second pixel (the pixel c1) in a case where the determination function 212 determines that the first pixel (the pixel a1) is not equivalent to spike noise.

If it is determined that the first pixel (the pixel a1) is not equivalent to spike noise, the calculation function 213 calculates the degree of similarity between the first pixel (the pixel a1) and the second pixel (the pixel c1) by comparing the first pixel (the pixel a1) and third neighboring pixels, which are included in a range from the first pixel (the pixel a1) in a frame direction, with the second pixel (the pixel c1) and fourth neighboring pixels, which are included in a range from the second pixel (the pixel c1) in the frame direction. Here, the frame direction is t direction (i.e., time direction) illustrated in FIG. 5. For example, the pixel a10, the pixel a11, and the like, are positioned in the frame direction from the pixel a1. The pixel a1, the pixel a10, and the pixel a11 are for example the pixels that correspond to the same detecting element of the X-ray detector 16, and they are different only in the time when an X-ray is detected.

The range in the frame direction is a range in the frame direction (time direction) for determining the pixels used for calculation of the degree of similarity. The range in the frame direction may be a preset range or a range that is set when an input operation is received from an operator via the input interface 22. Alternatively, there may be a case where the calculation function 213 sets a range in the frame direction on the basis of the frame that includes the first pixel. For example, the calculation function 213 sets a range in the frame direction in accordance with a frequency component of the frame that includes the first pixel or a magnitude of change in the pixel value between frames. For example, the calculation function 213 sets a wider range in the frame direction as a change in the pixel value between frames is smaller and correlation in the frame direction is higher.

For example, the range in the frame direction is set as "the range that corresponds to 3 frames including the frame that includes the first pixel" or "the range within 0.3 seconds from the frame that includes the first pixel". For example, if the range in the frame direction is "the range that corresponds to 3 frames including the frame that includes the first pixel", the third neighboring pixels included in the range from the first pixel (the pixel a1) in the frame direction are the pixel a10 and the pixel a11, and the fourth neighboring pixels included in the range from the second pixel (the pixel c1) in the frame direction are the pixel c2 and the pixel c3.

For example, the calculation function 213 calculates the degree of similarity between the first pixel (the pixel a1) and the second pixel (the pixel c1) by comparing the first pixel (the pixel a1) and the third neighboring pixels (the pixel a10 and the pixel a11) with the second pixel (the pixel c1) and the fourth neighboring pixels (the pixel c2 and the pixel c3). That is, the calculation function 213 calculates the degree of similarity between the pixels in a group, which correspond to 3 pixels in the frame direction (time direction) and do not spread in a spatial direction. Then, the averaging function 214 conducts weighted averaging on the pixels in accordance with the degree of similarity that is calculated for the group of pixels that do not spread in a spatial direction. This filtering process makes it possible to remove noise while it prevents X-ray images from being blurred due to smoothing if for example the pixel value largely changes in a spatial direction (if an X-ray image is acquired for a site with a complicated structure, or the like).

Next, an explanation is given of calculation of the degree of similarity in a case where the determination function 212 determines that the first pixel (the pixel a1) is equivalent to spike noise. For example, if the first pixel (the pixel a1) is spike noise and the degree of similarity between the first pixel (the pixel a1) and the second pixel (the pixel c1) is calculated by comparing the first pixel (the pixel a1) and the third neighboring pixels (the pixel a10 and the pixel a11) with the second pixel (the pixel c1) and the fourth neighboring pixels (the pixel c2 and the pixel c3), spike noise sometimes remains in the first pixel (the pixel a1) even though weighted averaging is conducted.

Specifically, if the first pixel (the pixel a1) is spike noise and the second pixel (the pixel c1) is not spike noise, the calculated degree of similarity is low and, even if weighted averaging is conducted, the pixel value of the first pixel (the pixel a1) is still large and spike noise remains. Furthermore, if the first pixel (the pixel a1) and the second pixel (the pixel c1) are spike noise, the calculated degree of similarity is high and, although weighted averaging is conducted together with the second pixel (the pixel c1), which is spike noise, the pixel value of the first pixel (the pixel a1) is still large and spike noise remains.

Conversely, if the pixel value of the first pixel (the pixel a1) is not used so that, for example, the degree of similarity between the first pixel (the pixel a1) and the second pixel (the pixel c1) is calculated by comparing the third neighboring pixels (the pixel a10 and the pixel a11) with the fourth neighboring pixels (the pixel c2 and the pixel c3), there is a decrease in the reliability of the calculated degree of similarity due to a comparison with two pixels. Furthermore, if the number of pixels used for calculation of the degree of similarity is increased by widening the ranges of the third neighboring pixels and the fourth neighboring pixels in the frame direction, X-ray images are sometimes unclear due to smoothing by being affected by changes in the pixel value in the frame direction (changes caused due to movement of the subject P during capturing, or the like).

Therefore, if it is determined that the first pixel (the pixel a1) is equivalent to spike noise, the calculation function 213 according to the third embodiment changes a spatial range of the pixels used for calculation of the degree of similarity. For example, if it is determined that the first pixel (the pixel a1) is equivalent to spike noise, the calculation function 213 calculates the degree of similarity by comparing the first neighboring pixels, which are included in a range from the first pixel (the pixel a1) in the vertical direction and in the horizontal direction of the frame with the second neighboring pixels, which are included in a range from the second pixel (the pixel c1) in the vertical direction and the horizontal direction of the frame.

Here, the vertical direction and the horizontal direction of frames are any two directions parallel to frames (X-ray images) and are for example the X direction and the Y direction, illustrated in FIG. 5. For example, the pixel c1, the pixel d1, the pixel e1, the pixel f1, and the like, are positioned in the vertical direction and the horizontal direction of the frame with respect to the pixel a1. The pixel a1, the pixel c1, the pixel d1, the pixel e1, and the pixel f1 are for example pixels that are simultaneously detected by different detecting elements of the X-ray detector 16. That is, the vertical direction and the horizontal direction of frames are a spatial direction, while the frame direction is a time direction.

A range in the vertical direction and the horizontal direction of the frame is a range for determining the pixels used for calculation of the degree of similarity. The range in the vertical direction and the horizontal direction of the frame may be a preset range or a range that is set when an input operation is received from an operator via the input interface 22. Alternatively, there may be a case where the calculation function 213 sets a range in the vertical direction and the horizontal direction of the frame on the basis of the frame that includes the first pixel. For example, the calculation function 213 sets a range in the vertical direction and the horizontal direction of the frame in accordance with a frequency component of the frame that includes the first pixel.

Furthermore, a range in the vertical direction and the horizontal direction of a frame is a range that has any size and shape and that is set as a two-dimensional range on the frame. For example, if a range in the vertical direction and the horizontal direction of the frame is a square area with 3 pixels in the X direction and 3 pixels in the Y direction, the first neighboring pixels are 8 pixels except for the first pixel (the pixel a1), included in the square area with the first pixel (the pixel a1) at a center, and the second neighboring pixels are 8 pixels except for the second pixel (the pixel c1), included in the square area with the second pixel (the pixel c1) at a center.

For example, if the first pixel (the pixel a1) is spike noise, the calculation function 213 does not use the pixel value of the first pixel (the pixel a1) for calculation of the degree of similarity. Furthermore, the calculation function 213 changes the pixels used for calculation of the degree of similarity from the third neighboring pixels (the pixel a10 and the pixel a11) and the fourth neighboring pixels (the pixel c2 and the pixel c3) into the first neighboring pixels (8 pixels except for the pixel a1, included in the square area of "3 pixels×3 pixels" with the pixel a1 at a center) and the second neighboring pixels (8 pixels except for the pixel c1, included in the square area of "3 pixels×3 pixels" with the pixel c1 at a center). Then, the calculation function 213 compares the first neighboring pixels with the second neighboring pixels and calculates the degree of similarity between the first pixel (the pixel a1) and the second pixel (the pixel c1).

As described above, if the first pixel (the pixel a1) is spike noise, the calculation function 213 does not use the pixel value of the first pixel (the pixel a1), and it increases the pixels used for calculation of the degree of similarity in a spatial direction. Therefore, although the calculation function 213 does not use the pixel value of the first pixel, which is spike noise, it increases the number of pixels used for calculation of the degree of similarity, whereby reliability of the degree of similarity may be improved. Furthermore, even though the second pixel (the pixel c1) is not spike noise, the calculation function 213 calculates a large value as the degree of similarity if their neighboring pixels are similar. Then, the averaging function 214 conducts weighted averaging on the first pixel (the pixel a1), which is spike noise, together with the second pixel (the pixel c1), which is not spike noise, with a weight as a high degree of similarity, thereby reducing spike noise in the first pixel (the pixel a1).

Heretofore, an explanation is given of a case where calculation of the degree of similarity and weighted averaging are conducted by using the pixel a1 as the first pixel and the pixel c1 as the second pixel among the pixels on the frame at the time t1. Furthermore, the calculation function 213 and the averaging function 214 sequentially change the pixel, which is the first pixel, and the pixel, which is the second pixel, among the pixels on the frame at the time t1 and conducts calculation of the degree of similarity and weighted averaging with regard to each combination of pixels included in the frame at the time t1. Moreover, for the frames other than the frame at the time t1, the calculation function 213 and the averaging function 214 conduct calculation of the degree of similarity and weighted averaging with regard to each combination of pixels included in a frame.

Then, the control function 215 stores each frame, which has undergone image processing (filtering process) by the determination function 212, the calculation function 213, and the averaging function 214, in the memory 25. Furthermore, the control function 215 causes the display 23 to present frames after image processing, stored in the memory 25. Here, the frames are presented as for example moving images in the display 23.

An explanation is given above of a case where if the first pixel is not spike noise, the range used for calculation of the degree of similarity is a range that corresponds to 3 pixels in a frame direction and that does not spread in a spatial direction. That is, an explanation is given of a case where if the first pixel is not spike noise, the degree of similarity is calculated in the range of (the horizontal direction (h) of the frame, the vertical direction (v) of the frame, the frame direction (f))=(1, 1, 3). Furthermore, an explanation is given above of a case where if the first pixel is spike noise, the range used for calculation of the degree of similarity is a square area of "3 pixels×3 pixels". That is, an explanation is given of a case where if the first pixel is spike noise, the degree of similarity is calculated in the range of (h, v, f)=(3, 3, 1). However, various modifications may be made to the range used for calculation of the degree of similarity.

For example, if the first pixel is spike noise, the calculation function 213 does not limit the range used for calculation of the degree of similarity to the pixels on the frame that includes the first pixel but may set it such that the pixels on a different frame are included. For example, if the first pixel is spike noise, the calculation function 213 calculates the degree of similarity in the range of (h, v, f)=(3, 3, 3). Specifically, there may be a case where if the determination function 212 determines that the first pixel is equivalent to spike noise, the calculation function 213 calculates the degree of similarity by comparing the first neighboring pixels included in a range from the first pixel in the vertical direction (v), the horizontal direction (h), and the frame direction (f) with the second neighboring pixels included in a range from the second pixel in the vertical direction (v), the horizontal direction (h), and the frame direction (f). In such a case, the first neighboring pixels are 26 pixels except for the first pixel, included in the range of (h, v, f)=(3, 3, 3) with the first pixel at a center, and the second neighboring pixels are 26 pixels except for the second pixel, included in the range of (h, v, f)=(3, 3, 3) with the second pixel at a center.

Furthermore, there may be a case where if it is determined that the first pixel is equivalent to spike noise, the calculation function 213 calculates the degree of similarity by comparing the first neighboring pixels with the second neighboring pixels, or there may be a case where the pixel value of the first pixel is replaced with the average value or the median value of the pixel values of the first neighboring pixels and the degree of similarity is calculated by comparing the first pixel, whose pixel value has been replaced, and the first neighboring pixels with the second pixel and the second neighboring pixels.

As described above, according to the third embodiment, if it is determined that the first pixel is not equivalent to spike noise, the calculation function 213 calculates the degree of similarity by comparing the first pixel and the third neighboring pixels, included in a range from the first pixel in the frame direction, with the second pixel and the fourth neighboring pixels, included in a range from the second pixel in the frame direction. Furthermore, if it is determined that the first pixel is equivalent to spike noise, the calculation function 213 calculates the degree of similarity by comparing the first neighboring pixels, included in a range from the first pixel in the vertical direction and the horizontal direction of the X-ray image, with the second neighboring pixels, included in a range from the second pixel in the vertical direction and the horizontal direction of the X-ray image. Therefore, even though the pixel value of the first pixel is not used, the X-ray diagnostic apparatus 100 according to the third embodiment may remove point-like noise while it keeps or increases the number of pixels used for calculation of the degree of similarity to maintain reliability of the degree of similarity.

The process of the processing circuitry 21, explained in the above-described first to third embodiments, is applicable to any filtering process that includes calculation of the degree of similarity between pixels and weighted averaging on pixels based on the degree of similarity. For example, the image processing method explained in the above-described embodiment is applicable to a filtering process that uses a coherent filter or a filtering process that uses a non-local means filter.

Furthermore, in the above first to third embodiments, an explanation is given of image processing on X-ray images that are acquired by the X-ray diagnostic apparatus; however, this is not a limitation on the embodiments. For example, the image processing method explained in the above-described embodiment is applicable to various radiation images (e.g., images captured by optical cameras) that may include point-like noise.

Furthermore, in the above-described first to third embodiments, an explanation is given of the X-ray diagnostic apparatus that includes the processing circuitry 21; however, this is not a limitation on the embodiments. For example, there may be a case where processing circuitry included in an image processing apparatus performs the functions that correspond to the determination function 212, the calculation function 213, and the averaging function 214. For example, the processing circuitry included in the image processing apparatus first acquires images such as X-ray images acquired by the X-ray diagnostic apparatus, determines whether each pixel included in the acquired image is equivalent to point-like noise, and calculates the degree of similarity between the first pixel and the second pixel, included in the image. Here, if it is determined that the first pixel is equivalent to point-like noise, the processing circuitry compares the first neighboring pixels, which are located around the first pixel, with the second neighboring pixels, which are located around the second pixel, thereby calculating the degree of similarity between the first pixel and the second pixel. Then, the processing circuitry conducts weighted averaging on the first pixel and the second pixel on the basis of the calculated degree of similarity.

Components of each device according to the above-described embodiments are functionally conceptual and do not necessarily need to be physically configured as illustrated in the drawings. Specifically, specific forms of separation and combination of each device are not limited to those depicted in the drawings, and a configuration may be such that all or some of them are functionally or physically separated or combined in any unit depending on various types of loads, usage, or the like. Furthermore, all or any of various processing functions performed by each device may be implemented by a CPU and a program analyzed and executed by the CPU or implemented as wired logic hardware.

The image processing method described in the above-described embodiments may be performed if a prepared image processing program is executed by a computer, such as a personal computer or workstation. The image processing program may be distributed via a network, such as the Internet. Furthermore, the image processing program is recorded in a recording medium readable by computers, such as hard disk, flexible disk (FD), CD-ROM, MO, or DVD, and it may be also executed by being read from the recording medium by a computer.

According to at least one of the above-described embodiments, point-like noise may be removed while a decrease in the resolution of images is prevented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing method comprising:
determining whether each pixel included in a radiation image is equivalent to point-like noise;
calculating a degree of similarity between a first pixel and a second pixel that are included in the radiation image; and
filtering the radiation image in accordance with the degree of similarity by replacing a pixel value of the first pixel with a weighted average value of the first pixel and the second pixel;
wherein, if it is determined that the first pixel is equivalent to the point-like noise, a pixel value of the first pixel is replaced with a statistical value based on pixel values of first neighboring pixels located around the first pixel, and the degree of similarity is calculated by comparing (a) the pixel value of the first pixel replaced by the statistical value and first neighboring pixels with (b) the second pixel and second neighboring pixels located around the second pixel.

2. The image processing method according to claim 1, wherein the statistical value is an average value of the pixel values of the first neighboring pixels.

3. The image processing method according to claim 1, wherein the statistical value is a median value of the pixel values of the first neighboring pixels.

4. An image processing method comprising:
determining whether each pixel included in a radiation image is equivalent to point-like noise, wherein the radiation image is any frame among frames acquired over time;
calculating a degree of similarity between a first pixel and a second pixel that are included in the radiation image; and
filtering the radiation image in accordance with the degree of similarity by replacing a pixel value of the first pixel with a weighted average of the first pixel and the second pixel;
wherein, if it is determined that the first pixel is not equivalent to the point-like noise, the degree of similarity is calculated by comparing (a) the first pixel and a first set of neighboring pixels included in a range from the first pixel in a time direction and located spatially in a same place as the first pixel with (b) the second pixel and a second set of neighboring pixels included in a range from the second pixel in the time direction and located spatially in a same place as the second pixel, and,
wherein, if it is determined that the first pixel is equivalent to the point-like noise, the degree of similarity is calculated by comparing (a) a third set of neighboring pixels included in a range from the first pixel in a vertical direction and a horizontal direction of the radiation image with (b) a fourth set of neighboring pixels included in a range from the second pixel in the vertical direction and the horizontal direction.

5. The image processing method according to claim 4, wherein, if it is determined that the first pixel is equivalent to the point-like noise, the degree of similarity is calculated by comparing (a) the third set of neighboring pixels included in a range from the first pixel in the vertical direction, the horizontal direction, and the time direction with (b) the fourth set of neighboring pixels included in a range from the second pixel in the vertical direction, the horizontal direction, and the time direction.

6. An image processing method, comprising:
determining whether each pixel included in a radiation image is equivalent to point-like noise, by calculating an index indicating statistical dispersion with regard to a function of pixel values of pixels included in a range; and determining whether each pixel included in the radiation image is equivalent to the point-like noise in accordance with the index calculated;
calculating a degree of similarity between a first pixel and a second pixel that are included in the radiation image; and
filtering the radiation image in accordance with the degree of similarity by replacing a pixel value of the first pixel with a weighted average value of the first pixel and the second pixel,
wherein, if it is determined that the first pixel is equivalent to the pointlike noise, calculating the degree of similarity by comparing a first neighboring pixels located around the first pixel with second neighboring pixels located around the second pixel.

7. The image processing method according to claim 6, wherein the function is a square root function of each pixel.

8. The image processing method according to claim 6, wherein the index is a standard deviation.

9. The image processing method according to claim 6, wherein it is determined whether each pixel included in the radiation image is equivalent to the point-like noise in accordance with the index and a modulation transfer function of the radiation image.

10. The image processing method according to claim 6, wherein the index indicating statistical dispersion is calculated with regard to a function of pixel values included in a range, which is set for each pixel.

11. An image processing apparatus comprising processing circuitry configured to execute the image processing method of claim 1.

12. An X-ray diagnostic apparatus comprising processing circuitry configured to execute the image processing method of claim 1.

13. An image processing apparatus comprising processing circuitry configured to execute the image processing method of claim 4.

14. An X-ray diagnostic apparatus comprising processing circuitry configured to execute the image processing method of claim 4.

15. An image processing apparatus comprising processing circuitry configured to execute the image processing method of claim 6.

16. An X-ray diagnostic apparatus comprising processing circuitry configured to execute the image processing method of claim 6.

* * * * *